(12) United States Patent
Seidemann et al.

(10) Patent No.: US 12,236,300 B2
(45) Date of Patent: Feb. 25, 2025

(54) SIGNATURES AND LABELS IN A BLOCKCHAIN DERIVED FROM DIGITAL IMAGES

(71) Applicant: BASF SE, Ludwigshafen am Rhein (DE)

(72) Inventors: Lothar Seidemann, Ludwigshafen am Rhein (DE); Holger Kai Peter Jelich, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 18/287,310

(22) PCT Filed: Apr. 19, 2022

(86) PCT No.: PCT/EP2022/060273
§ 371 (c)(1),
(2) Date: Oct. 18, 2023

(87) PCT Pub. No.: WO2022/223536
PCT Pub. Date: Oct. 27, 2022

(65) Prior Publication Data
US 2024/0193394 A1    Jun. 13, 2024

(30) Foreign Application Priority Data
Apr. 20, 2021  (EP) .................................. 21169419

(51) Int. Cl.
*G06K 19/06*    (2006.01)
*G06F 21/64*    (2013.01)
*G09F 3/00*    (2006.01)

(52) U.S. Cl.
CPC ....... *G06K 19/06037* (2013.01); *G06F 21/64* (2013.01); *G09F 3/0297* (2013.01)

(58) Field of Classification Search
None
See application file for complete search history.

(56) References Cited

U.S. PATENT DOCUMENTS

| 2004/0153649 A1 | 8/2004 | Rhoads et al. |
| 2020/0287898 A1 | 9/2020 | Weaver et al. |

FOREIGN PATENT DOCUMENTS

| AU | 2007201905 A1 | 11/2007 |
| EP | 1854642 A2 | 11/2007 |

(Continued)

OTHER PUBLICATIONS

International Search Report and Written Opinion received for PCT Patent Application No. PCT/EP2022/060273, mailed on Jun. 15, 2022, 12 pages.

(Continued)

*Primary Examiner* — Kristy A Haupt
(74) *Attorney, Agent, or Firm* — Faegre Drinker Biddle & Reath LLP

(57) ABSTRACT

A computer implemented method for generating at least one security label (110) using at least one printing device (112) is proposed. The method comprises the following steps: i) (114) generating a first digital image (116) comprising a plurality of colored pixels by printing a printer job with a printer control setting and scanning the printout using the printing device (112) thereby generating a digital fingerprint: ii) (118) providing a binary code (120) of identifier information: iii) (122) mapping the identifier information with the digital fingerprint by determining a binary code of the digital fingerprint and adding the binary code (120) of the identifier information to the color code of the first digital image (116); iv) (124) generating a second digital image (126) having a plurality of colored pixels different from the first digital image (116) by transferring the added binary codes into a color code of the second digital image (126): v)

(Continued)

Black:      54,687
„White"     26,741
Cyan:       573,479
Magenta:    25,623
Yellow:     124,759    f(In) ➔  339B  30D0  3CCA  30A5  36D4
                                [# black] [# „white"] [# cyan] [# magenta] [# yellow]

131

(128) printing the second digital image (126) on a substrate (129) thereby generating the security label (110).

12 Claims, 6 Drawing Sheets

(56) References Cited

FOREIGN PATENT DOCUMENTS

| EP | 2869241 A2 | 5/2015 |
|---|---|---|
| EP | 3340213 A1 | 6/2018 |
| EP | 3934222 A1 | 1/2022 |
| WO | 2021/001147 A1 | 1/2021 |

OTHER PUBLICATIONS

"Blockchain", Wikipedia, Retrieved on Dec. 29, 2023, URL: https://en.wikipedia.org/wiki/Blockchain , 31 pages.

"Improving Image Performance by Using Color Lookup Tables", Adobe developer support, Technical Note #5121, Mar. 31, 1992, URL: https://www.rgbtohex.net/hextorgb/.

Francisco et al., "The Supply Chain Has No Clothes: Technology Adoption of Blockchain for Supply Chain Transparency", Logistics, vol. 2, No. 2, Jan. 5, 2018, pp. 1-13.

Küppers, H. "Schule der Farben—Grundzüge der Farbentheorie für Computeranwender und andere", DuMont, Köln 2. Edition, ISBN 978-3-7701-2841-9 or www.farbtabelle.at/farben-umrechnen, 1992, 12 pages.

Reyes-Garcia, E., "The Image-Interface: Graphical Supports for Visual Information", Wiley, vol. 3, Oct. 2017, 288 pages.

Black: 54,687
„White" 26,741
Cyan: 573,479
Magenta: 25,623
Yellow: 124,759

Black: 54,687
„White" 26,741
Cyan: 573,479
Magenta: 25,623
Yellow: 124,759   f(In)→   339B   30D0   3CCA   30A5   36D4      131
                          [# black] [# „white"] [# cyan] [# magenta] [# yellow]

SIGNATURES AND LABELS IN A BLOCKCHAIN DERIVED FROM DIGITAL IMAGES

CROSS-REFERENCE TO RELATED APPLICATIONS

This application is a National stage application (under 35 U.S.C. § 371) of PCT/EP2022/060273, filed Apr. 19, 2022, which claims benefit of European Application No. 21169419.5, filed Apr. 20, 2021, both of which are incorporated herein by reference in their entirety.

TECHNICAL FIELD

The invention relates to a computer implemented method for generating at least one security label using at least one printing device, a method for protection of at least one object from counterfeiting, a method for product security, a security label and uses of the security label. The method and uses according to the present invention specifically may be used for product security of products of a supply chain, secure signature for wallets, governmental services, financial services, medical services. Other applications are possible.

BACKGROUND ART

Forgery-proof labeling is important for high-value products, which are exposed of high risk of hidden exchange when passing insecure environment while shipped along a supply chain. This is especially true, if the product cannot be identified easily due to shape, taste, odor or color. Secure digital signatures are required in several technical fields, e.g., in the fields of authentication in a blockchain or for applying for governmental services.

EP 2 869 241 A2 describes methods and systems for tracking a physical object to identify or authenticate it utilizing digital fingerprints, which are based on natural features, extracted from a digital image of the object.

EP 1 854 642 A2 describes a method of forming a label on an object comprising the steps of coating a surface of the object with optically variable ink, and bonding a patterned structure to the object with a light transmissive adhesive over the optically variable ink. The patterned structure allows light to propagate there through, and may be a diffractive structure comprising one of: a semi-transparent reflective layer, a high refraction index layer, and a patterned reflective coating.

Using blockchain technology for trading is described e.g. in "The Supply Chain Has No Clothes: Technology Adoption of Blockchain for Supply Chain Transparency" by Kristoffer Francisco and David Swanson, published Jan. 5, 2018, in www.mdpi.com/journal/logistics.

Despite these achievements, there is still a need for providing improved forgery-proof labeling, in particular improved in terms of security and costs.

Problem to be Solved

It is therefore desirable to provide methods and devices, which address the above-mentioned technical challenges, specifically, a computer implemented method for generating at least one security label using at least one printing device, a method for protection of at least one object from counterfeiting, a method for product security, a security label and uses of the security label shall be provided, which allow for forgery-proof labeling with improved security and reduced costs.

SUMMARY

This problem is addressed by a computer implemented method for generating at least one security label using at least one printing device, a method for protection of at least one object from counterfeiting, a method for product security, a security label and uses of the security label with the features of the independent claims. Advantageous embodiments which might be realized in an isolated fashion or in any arbitrary combinations are listed in the dependent claims.

In a first aspect of the present invention, a computer implemented method for generating at least one security label using at least one printing device is proposed. The method comprises the following method steps which, specifically, may be performed in the given order. Still, a different order is also possible. It is further possible to perform two or more of the method steps fully or partially simultaneously. Further, one or more or even all of the method steps may be performed once or may be performed repeatedly, such as repeated once or several times. Further, the method may comprise additional method steps which are not listed.

The method comprises the following steps:
i) generating a first digital image comprising a plurality of colored pixels by printing a printer job with a printer control setting by using the printing device and scanning the printout using a scanning device, or the printing device in case of a multi-functional printer providing a scanning function, thereby generating a digital fingerprint;
ii) providing a binary code of identifier information; ii)
iii) mapping the identifier information with the digital fingerprint by determining a binary code of the digital fingerprint and adding the binary code of the identifier information to the color code of the first digital image;
iv) generating a second digital image having a plurality of colored pixels different from the first digital image by transferring the added binary codes into a color code of the second digital image;
v) printing the second digital image on a substrate thereby generating the security label.

The term "security label" may refer, without limitation, to a label having properties which can be used for identification and authentication of the object. The security label may be configured for providing protection of the object from counterfeiting. The object may be at least one object selected from the group consisting of a commercial article such as a bottle, a paper document, a piece of a spare part, a wallet, a banknote, packaging and the like.

The identity of the object may comprise information about a unique identifier assigned to the object. The term "identification" may refer, without limitation, to a process of determining the unique identifier. The identification may allow tracking the object, such as in a supply chain from a manufacturer to a consumer. The term "authentication" may refer, without limitation, to a process of proving an assertion about identity and origin of the object. The origin of the object may comprise information about one or more of information about the manufacturer, information about the time and/or the space the object entered a supply chain. For example, in case the security label is verified to be true, the identity and origin of the object may be confirmed. In this case the object may be considered as genuine. Otherwise, in case the security label is not verified, the origin of the object may not be confirmed and the object may be considered as forgery.

The security label may be a feature of an object and/or attachable to an object. The security label may comprise a substrate and/or may be printable on a substrate. The substrate may be provided by the object itself. The substrate may be one or more of a piece of paper, a plastic film, cloth, metal, glass, or a surface of a spare part. For example, the security label may be part of a branding. For example, the security label may have a rectangular geometrical shape, a circular shape, an oval shape, a triangular shape, a polygonal form, a regular form, a random form, or an irregular form.

The method may comprise physically connecting the security label with the object. The security label may be configured for being attachable to the object such as by adhesively bonding or hot stamping to a surface of the object. For example, the security label may be self-adhesive.

The security label may be configured for providing mechanical protection. The security label may be configured as a seal, wherein the seal may be configured for providing an indication of any attempted detachment. The second digital image printed on the substrate may be physically connected with the object. The connection with the object may be done in that way that any removal of the printed security label would destroy the security label. For example, the security label may be adhered to a surface of the object and may destroy at removal. The seal may allow providing a visual indication in case of any attempt to break the seal. This may allow further enhancing security.

The term "generating of the security label" may refer, without limitation, to any processes of manufacturing the security label. In addition to the steps i) to v), the generating may comprise providing the substrate on which the second digital image is printed.

The term "printing device", also denoted as printer, may refer, without limitation, to a device configured for applying, e.g. printing, at least one material onto at least one printing surface or substrate, specifically in a patterned fashion, according to the printer control setting. The printing and scanning may be performed in a combined, multi-functional printer or may be performed in separated printing and scanning devices.

The term "digital image", also denoted digital picture, may refer, without limitation, to a two-dimensional representation of the physical object. The terms image and picture are used in the following as synonyms. The digital image may comprise a plurality of colored pixels. For example, the digital image may be a digital RGB image. The digital RGB image may be a color digital image having three color channels, i.e. one for red (R), one for green (G) and one blue (B). The primary colors of the digital RGB image may be red, green and blue. The RGB digital image may have a color channel for each primary color. The digital color image may comprise a plurality of image pixels, wherein each image pixel is made of combinations of the primary colors. For example, the digital RGB image may be 24-bit or 48-bit. Each pixel of the digital RGB image may be specified by two spatial coordinates and three color values. For example, the digital image may be a digital CMYK color image, wherein the primary colors of the CMYK color space are black, cyan, magenta, yellow and white. However, other color spaces are possible.

The term "printer job" may refer, without limitation, to at least one digital image of at least one physical object. Each printer job may comprise at least one digital image of at least one physical object.

The term "printer control setting" may refer, without limitation, to printer control information comprising a plurality of parameters for controlling at least one function of the printing device. For example, the printer control setting may comprise a string of characters of a pre-defined length. The printer control setting may comprise at least one item of blending information, which will be outlined in more detail below. Thus, typically, the printing device may be configured for generating text and/or images on the at least one printing surface according to the printer control setting, such as one or more of a string of characters, a bitmapped image, a vector image, a computer program, e.g. provided in at least one printer control language. In particular, the printing device, specifically at least one function of the printing device, may be controllable via at least one printer control language, such as one or more page description languages (PDLs), printer command languages (PCLs), PostScript, XML Paper Specification and the like.

The term "first digital image" may refer, without limitation, to a source digital image used for generating the digital fingerprint.

The term "generating a first digital image" may refer, without limitation, to a process of determining the color of pixels of the first digital image. The generating of the first digital image may comprise blending and/or mixing pigments and scanning the mixed pigments. Specifically, the generating of the first digital image may comprise blending pigments, in particular colored pigments, based on the printer control setting by using the printing device and scanning the blended pigments, in particular by using at least one scanning device such as of the printing device. With respect to embodiments of the printing device and the blending reference is made to WO 2021/001147, the full content is included herein by reference.

In particular, the printing device may be configured for blending the at least two materials according to the item of blending information, thereby e.g. generating the blend, onto a substrate for receiving the blend. The term "material" may refer, without limitation, to a chemical element or a chemical compound, specifically a chemical element or a chemical compound being capable of mixing with other chemical elements or chemical compounds. The material specifically may be suitable for pouring. The material generally may be in one or more of a solid state, specifically a granular solid state, a liquid state or a gaseous state. Specifically, the material may be or may comprise at least one of a powder or a liquid. The material may be a homogeneous, unitary material. Alternatively, the material may also comprise a plurality of components which are mixed homogeneously or inhomogeneously. Thus, the material may be a mixture or a composite by itself. As an example, the material may be or may comprise a liquid, wherein the liquid, as an example, comprise at least one solvent and at least one chemical compound dissolved, emulsified or dispersed in the at least one solvent. The solvent may form part of the material, or, alternatively, the at least one chemical compound may be considered the material, whereas the solvent may simply be considered as an adjuvant or additive to the material.

The term "blending" may refer, without limitation, to the process of mixing the at least two materials in a defined manner, thereby creating a blend. The terms blending and mixing will be used interchangeable herein. The process of creating the blend may include further steps such as temperature changes or temperature treatments of the at least two materials. The mixing take place in various ways, in accordance with the nature of the at least two materials. As an example, in case the at least two materials comprise powders, the mixing may involve co-dispensing or subsequently dispensing the powders into a common receptacle, including the option of stirring the mixture. Additionally or alternatively, in case the at least two materials comprise liquids, the mixing may also involve co-dispensing or subsequently dispensing the liquids into a common receptacle, including the option of stirring the mixture. Additionally or alternatively, as will be outlined in further detail below, the mixing may also comprise printing processes, e.g. inkjet printing of the at least two materials, e.g. onto a common substrate. Additionally or alternatively, the blending may comprise other types of mixing processes of the at least two materials, such as mixing the at least two materials on at least one common substrate. As an example, the blending may comprise one or more electrostatic precipitation processes, such as electrostatic precipitation of the at least two materials, e.g. onto a common substrate, e.g. onto an electrostatic charged surface. Thus, specifically, the blending and/or mixing may comprise electrostatic precipitation in printing processes. For example, the blending and/or mixing may comprise electrostatic precipitation in printing processes of at least two electrostatic charged materials onto an electrostatic neutralized surface. Thus, the materials may be mixed, thereby at least temporarily changing their electrical charges. Specifically, the blending and/or mixing may comprise electrostatic precipitation in laser printing processes, such as processes typically performed in a laser printer. In particular, the at least two materials, e.g. the pigments, may for example firstly be electrostatically charged and deposited on an equally charged image roll where specific areas have been electrostatically neutralized, e.g. by using a laser and/or LED. These deposited materials may, as an example, then be drawn and/or removed off the image roll by a reversely charged substrate, such as by a reversely charged paper.

The blending may leave the materials unchanged or may also fully or partially change the nature of the materials. Thus, as an example, the materials may simply be mixed without any chemical changes. Additionally or alternatively, the materials may be mixed, thereby changing their chemical nature. The latter specifically may take place in case the materials contain solvents which, during the blending or afterwards, may fully or partially evaporate. Again, additionally or alternatively, the materials may also fully or partially react with each other, thereby generating at least one reaction product.

The term "blend" may refer, without limitation, to a mixture of the at least two materials. The mixture specifically may be present in at least one receptacle and/or on at least one substrate. The mixture generally may be in one or more of a solid state, specifically a granular solid state, a liquid state or a gaseous state. Specifically, the mixture may be or may comprise at least one of a powder or a liquid. The mixture may be in the same state as the materials or may be in a different state. As an example, at least one of the materials may be in a liquid state, wherein the mixture may also be in a solid state, which may be the case e.g. after a drying process. Thus, as an example, the at least two materials may be mixed in the blending process in a liquid state, wherein, afterwards, a drying may take place, thereby evaporating at least one solvent and/or thereby changing the chemical nature of the mixed materials. As an example, the mixing process may imply a printing of the at least two materials in a liquid state onto at least one substrate, followed by a drying or setting process, wherein the blend, consequently, may be in a dried or solid state. Other examples may imply a phase change process, such as a curing or a solidifying of the materials after mixture.

The term "item of blending information" may also refer to the materials for blending, such as to quantities to be mixed in the blending process, e.g. to masses or volumes of the materials.

The term "blending device" may comprise at least one of a feed or a reservoir for each of the materials. The blending device may also comprise at least one blending element, such as at least one of a nozzle, a stirring device, a printer, a mixer or the like.

Consequently, the term "blend" may refer, without limitation, to a mixture of at least two materials. The blend specifically may be present on a substrate or in a receptacle. The blend specifically may comprise a finite amount of the materials.

The generating of the first digital image may comprise scanning the printout. The printout may refer to the blend on the substrate or in the receptacle. The printout may refer to the printed printer job being printed with the printer control setting. The scanning may comprise detecting at least one material property of the blend by using at least one detector. The term "material property" may refer, without limitation, to an arbitrary property of a material, such as of the blend. The property specifically may refer to one or more of a physical, a chemical or a biological property. Specifically, the material property may comprise at least one of a mechanical property or an optical property of the material. The material property specifically may refer to a measurable property of the respective material. More specifically, the at least one material property may be or may comprise at least one color of the blend. Additionally or alternatively the at least one property selected from the group consisting of: a specific density of the blend; a volume of the blend; a weight of the blend; an optical property of the blend; a spectral composition of the blend, specifically a color spectrum of the blend; a color intensity of the blend; a viscosity of the blend. Other material properties may be used alternatively or additionally.

The step of detecting the at least one material property of the blend specifically may comprise generating at least one item of measurement information on the material property. Thus, the at least one item of measurement information may generally refer to the result of a measurement of the at least one material property, such as to at least one numerical measurement value indicating the at least one material property of the blend or being characteristic for the at least one material property of the blend. Thus, as an example, the at least one item of measurement information may, as an example, comprise at least one of the following items of information: a specific density measurement value of the blend; a volume measurement value of the blend; a weight measurement value of the blend; an optical property measurement value of the blend; a color measurement value of the blend; a spectral composition measurement value of the blend, specifically a color spectrum measurement value of the blend; a color intensity measurement value of the blend; a viscosity measurement value of the blend. These measurement values might as an example each may be or may comprise a single number or a plurality of numbers, such as distributions, spectra or the like. Specifically, the at least one item of measurement information may be or may comprise at least one numerical value such as a digital value.

The term "detecting" may refer, without limitation, to the process of generating information on a property or measurable variable, wherein qualitative and/or quantitative information may be retrieved. The term specifically may refer to the process of measuring at least one measurable variable of the physical object. Consequently, the term "detector" may refer, without limitation, to an arbitrary device configured for performing the detecting process, such as a device having at least one sensor for measuring the at least one measurable variable of the object. As an example, the sensor may comprise one or more of: a weight sensor, specifically a scale; a volume sensor; a density sensor; a color sensor; a particle size distribution sensor. Other sensors may be used in addition or alternatively.

The at least one item of blending information specifically may comprise n blending variables, wherein n denotes a positive integer. The term "blending variable" may refer, without limitation, to a variable which either quantitatively or qualitatively describes at least one aspect or parameter of the blending. As an example, the blending variable may refer to the at least two materials, to detect of the blending process such as quantities or material streams for mixture or the like. Further, m material properties of the blend may be detected, with m being a positive integer. Specifically, the number m of material properties detected may be as large or larger than the number n of blending variables. In other words, preferably, men. In still other words, specifically, the information generated by the detection may be at least as large as the information used for the generating of the blend, wherein the term "information" may refer to the numbers n and m, respectively, and/or may generally refer to the number of degrees of freedom and/or to the logarithm of the degrees of freedom, such as log n or log m, respectively.

The at least two materials blended specifically may be different materials, specifically materials being different with respect to at least one property selected from the group consisting of: a chemical property, specifically a chemical composition; an optical property, specifically an optical appearance such as one or more of a color, a transparency, a brilliance; a mechanical property, specifically one or more of granularity, particle size, density, viscosity or flowing properties; an electrostatic chargeability; a compressibility; a crystallinity; a particle shape. Still, additionally or alternatively, other properties may be used.

The at least two materials specifically may comprise bulk materials and/or loose materials. The at least two materials, independently, each may be selected from the group consisting of solid materials, gaseous materials and liquid materials. More specifically, the at least two materials, independently, may be selected from the group consisting of and/or may comprise at least two materials selected from the group consisting of:
 a powder, specifically a powder selected from the group consisting of:
  an inorganic powder, specifically an inorganic powder made of a mineral;
  an organic powder, specifically an organic powder made of a polymer;
  a pigment;
  a toner powder;
 a liquid, specifically a liquid selected from the group consisting of a pure liquid, a suspension, an emulsion or a solution, more specifically one or more of a liquid color and an ink.

The term material and pigment may be used herein as synonyms. Thus, the term pigment may comprise a color particle, a powder, a liquid comprising these particles. The term pigment may comprise pure pigments and/or pigments having at least one polymer coating, e.g. of styrene acrylate copolymer, polyester resin, styrene butadiene copolymer, or similar polymers. Specifically, the term pigment may refer to toner powders. In the context of the present invention, any suitable pigment can be used. It is also possible to use mixtures of one or more pigments or toner powders of one or more pigments in the context of the present invention.

In the context of the present invention, the amount of the pigments used may vary. Preferably, the amount of pigments used is in the range of from $10^{-15}$ g/cm$^2$ to 1 g/cm$^2$, more preferable in the range of from $10^{-9}$ g/cm$^2$ to $10^{-3}$ g/cm$^2$.

The particle size of the pigments used preferably is in the range of from 10 nanometer to 1 mm, preferably, in particular in the range of from 100 nanometer to 100 micrometer.

Preferably, suitable pigments are selected from inorganic materials, preferably from metal oxides, metal oxides, preferably metal oxides from natural sources. Suitable may for example be pigments selected from iron oxides. Iron oxide pigments are relatively low-cost materials that resist color change due to exposure to sunlight, have good chemical resistance and are stable under normal ambient conditions. It has been found that iron oxides are particularly suitable since the materials can easily be recycled and reused. Iron oxide pigments can for example be collected and can be used as feedstock for steel production leading to the avoidance of disposal of used pigment as waste.

Suitable iron oxides are also available as natural pigments. Suitable red pigments may be derived from hematite, yellow and brown pigments, such as ochres, sierras and umbers, may be derived from limonite, and magnetite provides a black iron oxide pigment. Furthermore, synthetic pigments, in particular metal oxides such as iron oxides, which are manufactured under controlled conditions such that particle size, distribution and shape resulting in superior uniformity, may be used according to the present invention to improve color quality and chemical purity.

For example, pigments from natural sources are suitable for the method of the present invention such as pigments selected from natural organic materials, for example organic material from plants, animals, and minerals. Also suitable are pigments selected from synthetic organic materials such as for example azopigments. Suitable mineral pigments are for example ochre, sienna, azurite, cobalt or ultramarine. Also spinels may be used. Ochre is usually a red or yellow that is obtained from ore of iron or ferruginous clay. Sienna is a form of limonite clay that is derived from ferric oxides to produce a rich red. Azurite is found in the upper oxidized portions of copper ore deposits. Ultramarine can be obtained from lapis lazuli or can be artificially manufactured. Spinels are available in yellow, orange, turquoise, and blue. Further examples include: carmine lake natural red 4 (cochineal), natural yellow 3 lake (from plants), madder lake natural red 9 (madder root), indigo lake natural blue 2 (woad), chlorophylin green lake (plant matter), vegetable or bone black, titanium white, iron oxides, talc, chalk, kaolin and other earth pigments.

According to a further embodiment of the present invention, preferably at least 20%, more preferably 30%, and most preferably 40%, of the pigments used should be of natural origin, i.e. derived from natural products, other than products of the petrochemical industry, by simple separation or purification steps. Other embodiments are possible, too. For example, 100% of the pigments used can be of natural origin.

In the context of the present invention the term pigments also comprises pigments which are visible under UV light. Sustainable and eco-friendly materials may be used such as pigments from Clariant available under the Ecotrain label, for example pigments selected from the group of Novoperm Yellow HR 72, Hostaperm Blue B2G 03, Hostaperm Green GNX 01, Hansa Brilliant Yellow 2GX 72-S, Hostaperm Yellow H3G EDW VP 5131, Novoperm Orange HL 71, and Hostaperm Blue B2G-EDS VP 3491.

In the context of the present invention, it is also possible to use effect pigments such as for example absorption pigments, metal effect pigments, and pearlescent pigments. Metal effect pigments or metallic effect pigments usually consist of flakes or platelets of aluminum, copper, copper-zinc alloys, zinc and other metals. Suitable pearlescent pigments are for example mica-based pigments, but also pigments based on silica or alumina flakes. Suitable are for example pigments of natural mica coated with thin films of metal oxides such as $TiO_2$ or iron oxide. Furthermore, pigments based on silica flakes ($SiO_2$) or alumina ($Al_2O_3$) based pigments can be used in the context of the invention. Suitable substrate-free pearlescent pigments are for example natural pearl essence, basic lead carbonate, bismuth oxychloride, micaceous iron oxide and $TiO_2$ flakes.

The blending of the at least two materials may be performed according to at least one item of blending information. The at least one item of blending information specifically may comprise at least one of: quantities for the at least two materials to be blended; weights for the at least two materials to be blended; volumes of the at least two materials to be blended; a blending ratio of volumes of the at least two materials to be blended; a blending ratio of weights of the at least two materials to be blended; mixing instructions for mixing two or more continuous or discontinuous streams of the at least two materials to be blended; printing instructions for blending the at least two materials to be blended, such as a tilting information for blending the at least two materials to be blended using differently tilted raster images, e.g. raster images generated by a raster image processor (RIP) of a printer. Still, additionally or alternatively, other types of blending information may also be used.

The at least two materials may be fed into the blending device continuously or discontinuously. Thus, as an example, the blending device may comprise at least two reservoirs for the at least two materials to be blended. Additionally or alternatively, however, other means of feeding the materials into the at least one blending device are also possible. Thus, as an example, a continuous feeding is also possible, in addition or alternatively to using at least one reservoir for at least one of the materials.

The blending device may further comprise at least one receiving element for receiving the blend. The term "receiving element" may generally refer to an arbitrary element configured for receiving the blend. The receiving element specifically may have at least one receiving surface and/or at least one receiving material for receiving the blend. Thus, as an example, the at least one receiving element specifically may comprise at least one element selected from the group consisting of: a receiving vessel for receiving the blend; a substrate for receiving the blend. The at least one receiving element may be a stationary receiving element and/or maybe a moving receiving element, such as a rotatable receiving element. As an example, the receiving element may comprise at least one substrate, such as a substrate having at least one substrate surface which may be or may comprise a planar substrate surface and/or which may be or may comprise a curved substrate surface. As an example, the receiving element may comprise at least one drum having a receiving surface for receiving the blend, such as a rotating drum. The blend, by using the blending device, specifically may be deposited directly or indirectly on to the rotating drum. As an example, a drum may be used on which the blend is temporarily secured, such as electrostatically. These electrostatic drums are generally known in the technical field of printing, such as laser printing.

In case the receiving element comprises at least one drum, the drum specifically may be a rotating drum. Therein, the method may further comprise at least one cleaning step in which, after detecting the at least one material property, the blend specifically may be removed from the receiving surface of the drum. As an example, powders and/or pigments may be dispensed onto a rotating drum and may be, as an example, temporarily secured to the surface of the rotating drum by electrostatic forces. During that time of securing the blend to the surface of the rotating drum, the at least one material property of the blend on the surface might be detected, e.g. by optical reading. As an example and as will be outlined in further detail below, colors may be detected and, subsequently, may, as an example, be transformed into binary information, such as a binary row of numbers. Subsequently, the drum may be cleaned, such as by rotating into a cleaning position, e.g. by rotating the drum by 90°.

A similar procedure, optionally without the securing by electrostatic forces, may also be performed by using inkjet printing, either directly onto the surface of a drum and/or onto a moving substrate, such as onto a paper substrate. The drum, after detecting the at least one property, may be cleaned for reuse. Thus, as an example, the blending device may comprise at least one inkjet printer. The materials may be or may comprise inkjet printing of the materials, which may be or may comprise liquid materials, onto the at least one receiving element, such as onto the at least one rotating drum and/or onto at least one substrate. Subsequently, the detection of the at least one material property may take place, such as of the at least one optical property, e.g. by optical reading. As an example, again, colors may be detected and, subsequently, may, as an example, be transformed into binary information, such as a binary row of numbers. Subsequently, the drum may be cleaned, such as by rotating into a cleaning position, e.g. by rotating the drum by 90°. Additionally or alternatively, besides cleaning the at least one receiving element, a new receiving element or a new part of the receiving element may be used for further steps, such as for further printing and for repeating the blending and the detecting.

The blending device specifically may comprise at least one blending element for generating the blend. The term "blending element" may refer, without limitation, to an arbitrary element, device or combination of elements configured for blending the at least two materials, specifically by mixing the at least two materials, e.g. before, during or after deposition onto the at least one optional receiving element. As an example, the at least one blending element may be or may comprise at least one element selected from the group consisting of: a dispenser for continuously or discontinuously dispensing at least one of the two materials; a printer for printing the at least two materials onto at least one receiving element, specifically onto at least one substrate, specifically at least one printer selected from the group consisting of: an inkjet printer, a laser printer. Still, additionally or alternatively, other types of blending elements may be used. Thus, as an example, the blending element may be or may comprise at least one of a stirring element, a dispenser, a nozzle, an extruder.

The printing device may specifically be configured for blending the at least two materials according to the at least one item of blending information onto at least one substrate. In particular, the printer may be configured for blending the at least two materials according to the item of blending information, thereby e.g. generating the blend, onto a substrate for receiving the blend. The substrate may specifically be or may comprise at least one carrier medium, such as a carrier medium selected from the group consisting of: a glass carrier, such as a glass plate or a glass sheet; a plastic carrier, such as a plastic plate or a plastic sheet; a paper carrier, such as a paper sheet; a canvas. Other substrates may be feasible. As an example, the substrate may be a part of the printer itself or may be embedded within the printer. In particular, the substrate comprised by the printer may be a reusable carrier medium, such as a medium having a cleanable surface, e.g. a drum of the printer, for example a rotating drum.

The printing device may further be configured for blending the at least two materials such that at least one pattern, specifically at least one interference pattern, is generated. The at least two materials to be blended by the printer may in particular be different materials, specifically materials being different with respect to at least one property. As an example, the at least two materials to be blended by the printer may differ in at least one property selected from the group consisting of: a chemical property, specifically a chemical composition; an optical property, specifically an optical appearance such as one or more of a color, a transparency, a brilliance; a mechanical property, specifically one or more of granularity, particle size, density, viscosity or flowing properties; an electrostatic chargeability; a compressibility; a crystallinity; a particle shape.

The method may comprise transforming the detected material property into color values of pixels for generating the first digital image. The transforming may be performed by using at least one data processing device configured for applying at least one transformation algorithm to the material property. The transforming of the at least one material property into color values may take place in a computer-implemented fashion. Thus, the transforming of the at least one material property into the color values takes place by using at least one data processing device configured for applying the at least one transformation algorithm to the material property. The term "data processing device" may refer, without limitation, to a computer or a computer system, having at least one processor and optionally having at least one data storage device. Therein, the processor, as an example, may comprise at least one integrated circuit configured for executing computer readable instructions. The processor, additionally or alternatively, may also be or may comprise at least one application-specific integrated circuit and/or at least one fieldprogrammable gate array. The configuration of the data processing device for applying the at least one transformation algorithm, as an example, may be performed by providing a plurality of computer-readable instructions to the data processing device, e.g. via at least one data storage device and/or via at least one interface.

The transforming of the material property into color values may comprise subjecting the at least one material property to at least one test, specifically to at least one predetermined test. The at least one test may be or may comprise comparing the at least one material property directly or indirectly, such as by using the at least one item of measurement information, with at least one comparison value, at least one comparison value range or the like. Other mathematical tests are generally feasible and may also be applied. In accordance with the result of the at least one test, the RGB values may be generated. The transforming of the material property into color values specifically may comprise comparing the at least one material property, including the option of using the at least one item of measurement information representing the material property, with at least one threshold value. In accordance with the result of this comparison, for each primary color at least one number may be assigned to the material property.

Preferably, the first digital image may be generated by scanning, in particular digital scanning, the blend, or at least a region of interest of the blend. The scanning may be performed using at least one scanning device. The term "scanning device" may refer, without limitation, to a device configured for detecting at least one property of at least one object and/or element, e.g. of the blend. In particular, the scanning device may be configured for examining and/or detecting at least one material property of the blend. As an example, the scanning device may have at least one scanning element configured for optically recording and/or capturing spatially resolved one-dimensional, two-dimensional or even three-dimensional optical information on the blend. Thus, e.g. for optical detection, the scanning device may, for example, comprise at least one sensor, such as optical sensors, specifically image sensors, e.g. at least one light sensitive capacitor, at least one charge-coupled device (CCD). The scanning device may for example comprise at least one CCD-chip and/or at least one CMOS chip. Specifically, the scanning device may be configured for detecting optical signals of the blend, e.g. of the blended and/or merged powder components, such as by using an optical system. In particular, the scanning system may be configured for convert, e.g. break down, the optical signals of the blend into primary colors, such as into red, green and blue, e.g. by using a prism. The scanning device may specifically be configured for converting the optical signals, such as the optical signals converted into primary colors, into at least one digital image, e.g. by using at least one sensor, such as a sensor comprising a plurality of light-sensitive capacitors. Further, the scanning device may comprise at least one illuminating element, such as an element configured for illuminating the blend, wherein the scanning device may be configured for detecting the at least one property of the blend by using a reflection of the blend. Herein, the scanning device may also be referred to as scanner. The scanning device may specifically be or may comprise a device selected from the group consisting of: a CCD scanner; a CIS scanner; a camera; a film. In particular, the scanning device may comprise at least one optical detection system, specifically comprising one or more of an optical detector, an image sensor, for example a photomultiplier tube (PMT), e.g. a vacuum tube converting incident photons into an electric signal, a silicon photomultiplier (SiPM), e.g. a solid-state device converting incident photons into an electric signal. The scanning device may specifically comprise at least one processor, wherein the processor may be configured for controlling at least one scanning operation of the scanning device.

Scanning may for example be performed using light of a wavelength at scanning in the range of from 10 nm to 1 mm, preferably in the range of from 300 nm to 800 nm. The luminous intensity per $m^2$ of the light used preferably is in the range of from 0.001 $lm/m^2$ and 10000000 $lm/m^2$, more preferable in the range of from 10 $lm/m^2$ and 1000000 $lm/m^2$.

In cryptography, a digital fingerprint usually refers to an almost unique identification of data as the result of a hash function. The term "digital fingerprint" may refer, without limitation, to a unique image that references all kinds of data, e.g. product information data or personal data as e.g. passport number or health insurance number. The first digital image may be based on a physical image, which may be generated by printing a printer job, i.e. an image, while changing the printer control setting. Due to the individual setting of printer control setting and of printer job, the printout may be unique. The unique printout may be scanned and converted into the first digital image. The first digital image may be a colored image being based on RGB color space.

Step i) may comprise generating a digital image element by sizing the first digital image to a pre-defined size. The size of digital image element may be larger than a size of the identifier information. The term "digital image element" may refer, without limitation, to a section or cutout of the first digital image. The term "sizing" may refer, without limitation, to adapting and/or selecting and/or reducing and/or cutting the full first digital image to a digital image element comprising a region of interest.

The term "identifier information" may refer, without limitation, to data relating to identity and origin of the object. The identifier information may be provided in binary format, denoted as binary code herein. The identifier information may be one or more of a product name, an expiry date, a customer, hazardous information, weight, storage temperature, and the like.

The term "mapping" the identifier information with the digital fingerprint, may refer, without limitation, to adding the identifier information to the pixel information, in particular the color code, of the first digital image. Specifically, the mapping of the identifier information and the first digital image may comprise adding a binary code of the identifier information to a color code of the first digital image. The color code of the first digital image may be the basis, which is used for mapping information data, in particular the identifier information.

The mapping may be performed as follows. The color code, i.e. the color values of each pixel, of the first digital image may be converted into hexadecimal numerals. For example, the conversion of the color values into hexadecimal numerals may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The hexadecimal numerals may be further converted into the binary code of the first digital image, for example, by using at least one mathematical algorithm and/or at least one predetermined relationship such as a look-up table, e.g. as described in "Improving Image Performance by Using Color Lookup Tables, Adobe developer support, Technical Note #5121, 31 Mar. 1992 or https://www.rgbtohex.net/hextorgb/. The binary code of the first digital image and the identifier information may be added.

The new binary information of the mapped data may be transferred into the color code of the second digital image. The added binary codes may be converted into hexadecimal numbers which may be converted into color values. For example, the conversion of hexadecimal numerals into the color values may be performed using at least one mathematical algorithm and/or at least one pre-determined relationship such as a look-up table, e.g. as described in www-.farbenumrechnen.de or "The Image-Interface: Graphical Supports for Visual Information", Everardo Reyes-Garcia, John Wiley & Sons, 2017, ISBN 978-1-1194-7497-5. The second digital image may be generated by using the determined color values for the corresponding image pixels. The second digital image may differ from the first digital image. In particular, the pixels of the first digital image and the second digital image have different color values. The second digital image may be an RGB image, wherein the primary color of the RGB image are red, green and blue. The second digital image is forgery-proof, if the applied printer control setting and applied printer job is kept secretly. The method comprises printing the second digital image on a substrate thereby generating the security label. The printing may be performed using the printing device.

The method may further comprise generating at least one verification number. The term "verification number" may refer, without limitation, to a numeric value of a fixed length which uniquely representing data.

The generating of the verification number may comprise
vi) converting color values of the pixels of the second digital image to a secondary color space having at least four primary colors and determining a number of respectively colored pixels for each primary color of the secondary color space;
vii) generating the verification number by converting the determined number of respectively colored pixels for each primary color of the secondary color space to numerals.

The term "secondary color space" may refer, without limitation, to an arbitrary color space having a suitable number of primary colors, i.e. at least four primary colors. Preferably, the secondary color space is the CMYK color space, wherein the primary colors of the secondary color space are black, cyan, magenta, yellow and white, whereby white is meant as no color on a white substrate. The conversion from the RGB color space to the secondary color space may be performed for each pixel of the second RGB image. The conversion from the RGB color space to the secondary color space may be performed using at least one mathematical algorithm and/or at least one pre-determined relationship such as a look-up table, e.g. as described in "Schule der Farben-Grundzüge der Farbentheorie für Computeranwender und andere", Küppers, Harald, DuMont Buchverlag, Köln 2. Edition, ISBN 978-3-7701-2841-9 or www.farbtabelle.at/farben-umrechnen. The conversion from the RGB color space may be performed using at least one software, in particular a software of the printer for converting the RGB colors.

The converted image may be further transformed into a pattern, thereby forming a rastered image. The pattern may be a grid. The pattern may comprise at least one matrix comprising rows and columns indicating the presence or absence of primary colors of the respective pixel. The further transformation, in particular rastering, may be performed by the printer software. Next, the colored dots may be counted. The determining of the number of respectively colored pixels for each primary color of the secondary color space may comprise counting colored dots of the converted and rastered image, in particular of the matrices.

The determined number of pixels of each primary color may be converted to hexadecimal numerals. Specifically, the color dot numbers are transferred to hexadecimal numerals. The conversion of the determined number into hexadecimal numerals into the color values may be performed using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/.

The generating of the verification number may comprises converting the determined number of respectively colored pixels for each primary color of the secondary color space via a pre-defined formula to fixed-size hexadecimal values. Specifically, the determined number of pixels of each primary color may be converted to a fixe-size value without decimal digits. The pre-defined formula may be a logarithmic formula. The information of the counted dots may be transferred into hexadecimal numerals via a logarithmic formula to fixed-size values. The pre-defined mathematical formula for converting the determined number of respectively colored pixels for each primary color of the secondary color space to fixed-size hexadecimal values may be "a+b*x+c*(x/16)+d*1000*ln(x+1), wherein "x" is the number of pixels of each primary color and a, b, c and d are parameters. For example, for generating 4-digit hexadecimal numerals, the value of "a" may be 4,096 for all of the following cases: In case of the sum of all pixels of each primary color is smaller than 60,000, "b" is 1, "c" and "d" are 0; in case of the sum of all pixels of each primary color is between 60,000 and 950,000, "c" is 1, "b" and "d" are 0. In case of the sum of all pixels of each primary color is larger than 950,000, "d" is 1, "b" and "c" are 0. Thereby, the result from the calculation by the predefined formula may be rounded down to full hexadecimal numerals." For example, for generating verification number of other fixed-size than 4-digit hexadecimal numerals, e.g. 3-digit or 10-digit, "a", "b", "c" and "d" may be be adjusted accordingly.

As described above, the RGB color code of the second digital image derived from mapping the identifier information and the individual digital fingerprint may transferred into the color code of second color space, which can be the CMYK color space. The dots of the colors, which would be placed on a substrate in case of printing, may be counted and transferred into hexadecimal numerals. So, the "hash value" of the security label may be generated by converting the determined number of respectively colored pixels for each primary color of the secondary color space to hexadecimal numerals. The hexadecimal numerals are applied as the verification number, which may be unique as the second digital image of the security label.

The security label may comprise optical readable information printed on the substrate, in addition to the second digital image. The method may comprise printing the verification number on the substrate as one or more of numerals, barcode, 2D code such as 2D barcode or QR code, and/or storing the verification number on at least one electronic chip attached to the substrate.

The term "numerals" may refer, without limitation, to at least one character or sequences of characters. The numerals may comprise one or more of at least one number, at least one letter, at least one punctuation mark, and whitespace.

The term "2D code" may refer, without limitation, to any opto-electronically readable font, in particular comprising of bars or dots of different widths and gaps between them with the highest possible contrast. Embodiments of 2D code can be found e.g. in de.wikipedia.org/wiki/2D-Code The term "bar code" may refer, without limitation, to binary optical information, such as to a binary sequence of optical information, such as a sequence of parallel lines having different widths, the binary sequence encoding information such as a number and/or an array of numbers and/or letters. Thus, the bar code may be a sequence of single colored lines having a high contrast compared to a background. Specifically, the bar code may comprise black lines on a white background.

The term "QR code" may refer, without limitation, to a quadratic matrix of binary pixels, the matrix encoding information such as a number and/or an array of numbers and/or letters. The pixels of the quadratic matrix may have a high contrast compared to a background. Specifically, the pixels of the matrix may comprise black squares arranged on a white background. Further, the QR code may comprise an indication of orientation enabling the reading device of the QR code to align the matrix.

The electronic chip may be comprised by an RFID tag. The term "RFID tag" may refer, without limitation, to a label configured for exchanging data information with a reading device by using radio-frequency electromagnetic radiation, such as by using the NFC standard. The RFID tag may further comprise an antenna configured to receive and to emit a radio-frequency signal and an electronic chip such as a microchip configured to store the data information. Specifically, the RFID tag may be a flexible substrate having an electronic conducting coil and optionally at least one microchip.

The method may comprise generating a blockchain of security labels. The term "blockchain" may refer, without limitation, to a growing list of records, called blocks, that are linked using cryptography. The term "block" may refer, without limitation, to a component or an element of the blockchain. By design, a blockchain is resistant to modification of the data. It is "an open, distributed ledger that can record transactions between two parties efficiently and in a verifiable and permanent way", see en.wikipedia.org/wiki/Blockchain. For use as a distributed ledger, a blockchain is typically managed by a peer-to-peer network collectively adhering to a protocol for inter-node communication and validating new blocks. Each block includes the cryptographic hash of the prior block in the blockchain, linking the two. The linked blocks form a chain. This iterative process confirms the integrity of the previous block, all the way back to the original genesis block. The blockchain technology typically requires a cryptographic hash function, multiple information needs to be processed and a Hash function to map data of arbitrary size to fixed-size values such that the data in any given block cannot be altered retroactively.

The blockchain may be a blockchain of a supply chain. The blocks may reflect results of each checkpoint starting at the manufacturer. The second digital image may be used as block and the verification number as hash. Method steps i) to vii) may be repeated for each subsequent block using the second digital image of the preceding block as respective first digital image. The verification number may be be uploaded into the blockchain of the supply chain. The verification number may be used to monitor the product movement from checkpoint to checkpoint. The movement of the product from checkpoint to checkpoint may be defined as transaction. The checkpoints can be an interim storage or passing customs.

In a further aspect, a method for protection of at least one object from counterfeiting is proposed. The method comprises the following steps:
 a) Generating at least one security label using a method for generating at least one security label according to the present invention,
 b) Verification if the security label is true, wherein the verification comprises reading the security label, retrieving at least one verification digital image from at least one database depending on the read security label, and comparing the retrieved verification digital image with the second digital image of the security label, wherein the security label is verified if the retrieved verification digital image and the second digital image of the security label are identical at least within tolerances.

Further, the method may comprise additional method steps which are not listed.

The method comprises generating at least one security label using a method for generating at least one security label according to the present invention as described above or as described in more detail below. For possible definitions, options or embodiments, reference may be made to the description of the method for generating at least one security label given above or as given in more detail below.

The term "reading" may refer, without limitation, to the process of retrieving at least one item of information, such as the at least one item of information stored in the security label. The item of information may be the optical readable information comprising the verification number and/or the verification number, e.g. in the electronic format, stored on the at least one electronic chip attached to the substrate of the security label. The reading may be performed by at a checkpoint. The reading may be performed by the consumer.

The reading may be performed by a reading device. The term "reading device" may refer, without limitation, to a device configured for performing the reading as defined above. Specifically, the reading device may be or may comprise at least one of: a one- or two-dimensional scanner, a camera and/or a radio frequency reading device, such as a NFC reader.

The reading specifically may take place electronically. The process of reading may depend on how the verification is present in the security label. The reading may comprise an optical reading in case of an optical identifier is used, such as a bar code and/or a QR code, e.g. by optical scanning. In case the verification number is stored as an RFID code, the reading may comprise an electronic reading, such as a reading by near field communication (NFC). Other options are feasible.

The reading device may be integrated into a mobile device. The mobile device may be a mobile electronics device, more specifically to a mobile communication device such as a cell phone or smart phone. The mobile device may also refer to a tablet computer or another type of portable computer. Additionally or alternatively, the reading may be performed by a human. The method may further comprise inputting the read verification number into a user-interface of the mobile device.

The term "database" may refer, without limitation, to an organized collection of data, generally stored and accessed electronically from a computer or computer system. The database may comprise or may be comprised by a data storage device. The database may comprise at least one data base management system, comprising a software running on a computer or computer system, the software allowing for interaction with one or more of a user, an application or the database itself, such as in order to capture and analyze the data contained in the data base. The database management system may further encompass facilities to administer the database. The database, containing the data, may, thus, be comprised by a database system which, besides the data, comprises one or more associated applications. The database may be or may comprise at least one database selected from the group consisting of: at least one server, at least one server system comprising a plurality of servers, at least one cloud server or cloud computing infrastructure. The database may comprise the blockchain and/or a representation of the blockchain.

The term "retrieving" may refer, without limitation, to the process of a system, specifically a computer system, generating data and/or obtaining data from an arbitrary data source, such as from a data storage, from a network or from a further computer or computer system. The retrieving specifically may take place via at least one computer interface, such as via a port such as a serial or parallel port. The retrieving may comprise several sub-steps, such as the sub-step of obtaining one or more items of primary information and generating secondary information by making use of the primary information, such as by applying one or more algorithms to the primary information, e.g. by using a processor.

The retrieving may comprise sending a query to the database comprising the verification number, e.g. by using a communication interface of the mobile device, and receiving the response from the database, e.g. by using the communication interface of the mobile device. The term "communication interface" may refer, without limitation, to an item or element forming a boundary configured for transferring information. In particular, the communication interface may be configured for transferring information from a computational device, e.g. a computer, such as to send or output information, e.g. onto another device. Additionally or alternatively, the communication interface may be configured for transferring information onto a computational device, e.g. onto a computer, such as to receive information. The communication interface may specifically provide means for transferring or exchanging information. In particular, the communication interface may provide a data transfer connection, e.g. Bluetooth, NFC, inductive coupling or the like. As an example, the communication interface may be or may comprise at least one port comprising one or more of a network or internet port, a USB-port and a disk drive. The communication interface may be at least one web interface.

The term "verification digital image" may refer, without limitation, to a digital image retrieved from the database in response to the query comprising the verification number of the security label attached to the object.

The verification, if the security label is true, may be done by comparing the retrieved verification digital image with the second digital image of the security label. The verification may be done by comparing the verification digital image with the digital image in the blockchain of supply chain. The verification may comprise scanning the second digital image printed on the substrate. The verification may comprise comparing the scanned second digital image and the verification digital image. The comparison of the scanned second digital image and the verification digital image may be performed by using at least one processing device. The comparison of the scanned second digital image and the verification digital image may be performed by using at least one image comparison algorithm.

The comparing of the colored pixels of the verification digital image and the scanned second digital image may be performed pixelwise. The method may comprises pixelating the scanned second digital image and/or the verification digital image. The pixelating may comprise dividing the scanned second digital image and/or the verification digital image into pixels, in particular in a pre-defined number of pixels. For example, the pre-defined number of pixels may correspond to the number of pixels of the verification digital image. For example, the pre-defined number of pixels may depend on security requirements.

The method may comprise determining a color code of the pixelated second digital image by converting the colored pixels to, e.g. hexadecimal or binary, numerals. For example, the conversion of the color values into hexadecimal numerals may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The hexadecimal numerals may be further converted into the binary code of the second digital image, for example, by using at least one mathematical algorithm and/or at least one predetermined relationship such as a look-up table, e.g. as described in "Improving Image Performance by Using Color Lookup Tables, Adobe developer support, Technical Note #5121, 31 Mar. 1992 or https://www.rgbtohex.net/hextorgb/.

The comparing of the colored pixels of the second digital image and the verification digital image may comprise comparing color codes of the pixelated second digital image and the verification digital image. The comparing may comprise determining if the second digital image and the verification digital image are identical at least within a pre-defined pixel color tolerance range. The retrieved verification digital image and the second digital image of the security label may be considered identical if they are identical with respect to at least one primary color at least within tolerances. The retrieved verification digital image and the second digital image of the security label may be considered identical within a pixel color error tolerance range of ±30% for each of the primary colors of a pixel, preferably of ±10% for each of the primary colors of a pixel, more preferably of ±3% for each of the primary colors of a pixel. The retrieved verification digital image and the second digital image of the security label may be considered identical within an overall error tolerance range 10% of deviating pixels, preferably of 5% of deviating pixels, more preferably 1% of deviating pixels. As the optical appearance of the security label can be differ compared to its digital image, e.g., due to possible aging of the security label or due to different light spectrum while scanning, the verification of the label can be done by focusing on one color of the RGB color space, e.g., by only comparing the share of the red color of the scanned pixels. The error tolerance may lead to positive verification, if, firstly, the result of matching the color code of the scanned second digital image of the security label with the color code with its verification digital image uploaded in the blockchain is between certain boundaries, e.g., +−10%. Besides comparing the entire color code of the digital images, fraction of the full RGB color information can be used, e.g., red. Besides red, the verification of the security label may be done by the fraction of the blue color and by the fraction of the green color. The error tolerance may be defined by the share of pixels of the second digital image, which is congruent with its verification digital image uploaded in the blockchain, meaning that e.g., 90 of 100 pixels are according to pixels of the verification digital image uploaded in the blockchain. Both kinds of error tolerances may be applied in a combined way.

In a further aspect, a method for method for product security is proposed. The method comprises the following steps:
  I) generating at least one security label using a method for generating at least one security label according to the present invention and physically connecting the security label with a product, wherein the identifier information is information about the product;
  II) generating at least one verification number, wherein the generating of the verification number comprises converting color values of the pixels of the second digital image to a secondary color space having at least four primary colors, determining a number of respectively colored pixels for each primary color of the secondary color space and generating the verification number by converting the determined number of respectively colored pixels for each primary color of the secondary color space to numerals;
  III) applying the verification number on the substrate;
  IV) adding the second digital image as block and the verification number as hash to a blockchain of security labels of a supply chain.

Further, the method may comprise additional method steps which are not listed.

The method comprises generating at least one security label using a method for generating at least one security label according to the present invention as described above or as described in more detail below. For possible definitions, options or embodiments, reference may be made to the description of the method for generating at least one security label given above or as given in more detail below. Moreover, with respect to generating at least one verification number reference is made to the description of generating of the verification number above or as described in more detail below.

The applying of the verification number may comprise printing the verification number on the substrate as one or more of numerals, barcode, 2D code such as 2D barcode or QR code and/or storing the verification number on at least one electronic chip attached to the substrate.

The method may further comprise monitoring product movement from check point to checkpoint by using the verification number.

The method may comprise verification if the security label is true, wherein the verification may comprise reading, in particular scanning, the security label, retrieving at least one verification digital image from the blockchain of security labels depending on the scanned security label, and comparing the retrieved verification digital image with the second digital image of the security label. The security label may be verified if the retrieved verification digital image and the security label are identical at least within tolerances. The retrieved verification digital image and the second digital image of the security label may be considered identical if they are identical with respect to at least one primary color at least within tolerances. The retrieved verification digital image and the second digital image of the security label may be considered identical within a pixel color error tolerance range of ±30% for each of the primary colors of a pixel, preferably of ±10% for each of the primary colors of a pixel, more preferably of ±3% for each of the primary colors of a pixel. The retrieved verification digital image and the second digital image of the security label may be considered identical within an overall error tolerance range 10% of deviating pixels, preferably of 5% of deviating pixels, more preferably 1% of deviating pixels. With respect to the process of verification reference is made to the description of a method for protection of at least one object from counterfeiting as given above or as described in more detail below.

In a further aspect a security label is proposed. The security label is generated using a method for generating at least one security label according to the present invention as described above or as described in more detail below. For possible definitions, options or embodiments, reference may be made to the description of the method for generating at least one security label given above or as given in more detail below.

In a further aspect use of a security label according to the present invention is proposed, for a purpose of product security of products of a supply chain, secure signature for wallets, governmental services, financial services, medical services etc. Other applications are possible.

For example, an application of the digital fingerprint generated according to the method above, may be a secure signature for wallets and similar applications. The digital information of the owner of the signature may be changed into a digital fingerprint. The identifier information of the owner of the signature to be used may be one or more of name, address, personal fingerprint or the face or parts of the face as the iris of the eye, name of the parents, birthday, social security number or can be the binary code of another digital image of a personal image library of the owner of the signature. The digital fingerprint of the owner may be transferred into a digital information of a secure signature, which can consist of decimal numerals and characters. The code of the information of the owner of the signature may be mapped with the color code of the first digital image, thereby generating the second digital image. The first digital image can be a digital image of the personal image library of the owner of the signature, e.g., a photo of a physical object.

Forgery-proof labeling is important for high-value products, which are exposed of high risk of hidden exchange when passing insecure environment while shipped along a supply chain. This is especially true, if the product cannot be identified easily due to shape, taste, odor or color. Secure digital signatures may be required, e.g., in the fields of authentication in a blockchain or for applying for governmental services. The costs for implementation of the invention may be less than competitive solutions as e.g., RFID chips, holograms.

BRIEF DESCRIPTION OF THE DRAWINGS

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

In the Figures.

DETAILED DESCRIPTION OF THE EMBODIMENTS

Figure 1:
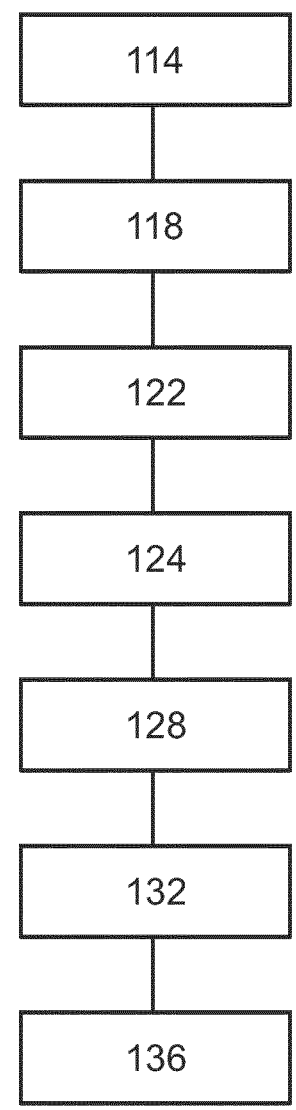
FIG. 1 show an embodiment of a method for generating at least one security label using at least one printing device.

In FIG. 1 a schematic illustration of an embodiment of a computer implemented method for generating at least one security label 110 using at least one printing device 112. The printing device 112 may be a multi-functional printer comprising a scanning function and, thus, may be embodied as scanning device 112, too. The method comprises the following steps:

i) (reference number 114) generating a first digital image 116 comprising a plurality of colored pixels by printing a printer job with a printer control setting by using the printing device 112 and scanning the printout using the scanning device 112 thereby generating a digital fingerprint;

ii) (reference number 118) providing a binary code 120 of identifier information;

iii) (reference number 122) mapping the identifier information with the digital fingerprint by determining a binary code of the digital fingerprint and adding the binary code 120 of the identifier information to the color code of the first digital image 116;

iv) (reference number 124) generating a second digital image 126 having a plurality of colored pixels different from the first digital image 116 by transferring the added binary codes into a color code of the second digital image 126;

v) (reference number 128) printing, in particular by using the printing device 112, the second digital image on a substrate 129 thereby generating the security label 110.

Figure 2A:
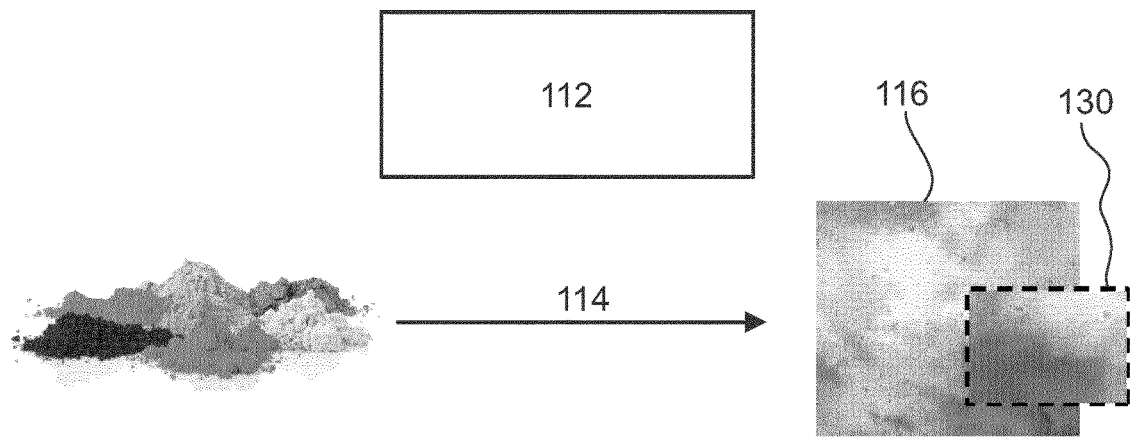
FIGS. 2A to 2E show an embodiment of generating a verification number.

The printing device 112, as schematically shown in FIG. 2A, may be configured for applying, e.g. printing, at least one material onto at least one printing surface or substrate, specifically in a patterned fashion, according to the printer control setting. In particular, the printing device 112 may comprise one or more of a drum, such as an image drum; a laser, a lens system, such as a lens system comprising at least one mirror, e.g. a rotatable mirror; a cleaning element, such as a roll, a scraper or similar means for cleaning, e.g. for cleaning the drum; a cassette, e.g. for storing one or more of the substrate, such as a paper cassette; at least one transporting element, such as a roller and/or conveyor, e.g. for feeding, transferring and/or ejecting the substrate, specifically the paper, into, within and/or from the printing device; a printer control unit configured for controlling the printing device.

The generating of the first digital image 116 may comprise blending and/or mixing pigments and scanning the mixed pigments, see FIG. 2A. Specifically, the generating of the first digital image 116 may comprise blending pigments, in particular colored pigments, based on the printer control setting by using the printing device 112 and scanning the blended pigments, in particular by using at least one scanning device such as of the printing device 112. With respect to embodiments of the printing device 112 and the blending reference is made to WO 2021/001147, the full content is included herein by reference.

The digital fingerprint may be a unique image that references data. The first digital image 116 may be based on a physical image, which may be generated by printing a printer job, i.e. an image, while changing the printer control setting. Due to the individual setting of printer control setting and of printer job, the printout may be unique. The unique printout may be scanned and converted into the first digital image. The first digital image 116 may be a colored image being based on RGB color space.

Step i) 124 may comprise generating a digital image element 130, see FIG. 2A, by sizing the first digital image 116 to a pre-defined size. The size of digital image element 130 may be larger than a size of the identifier information. The digital image element 130 may be a section or cutout of the first digital image 116. The sizing may comprise adapting and/or selecting and/or reducing and/or cutting the full first digital image 116 to a digital image element 130 comprising a region of interest.

The identifier information may be data relating to identity and origin of an object to which the security label is attached to. The identifier information may be provided in binary format, denoted as binary code herein. The identifier information may be one or more of a product name, an expiry date, a customer, hazardous information, weight, storage temperature, and the like.

Figure 2B:
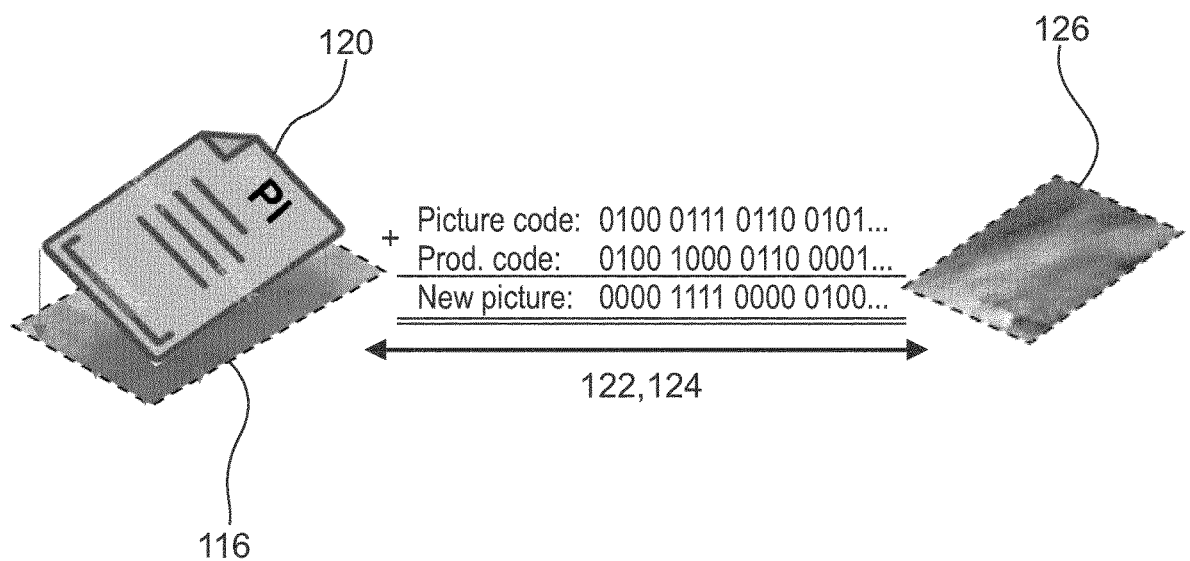

FIG. 2B shows an embodiment of the mapping 122 of the identifier information with the digital fingerprint. The mapping 122 may comprise adding the identifier information to the pixel information, in particular the color code, of the first digital image 116. Specifically, the mapping of the identifier information and the first digital image 116 may comprise adding a binary code 120 of the identifier information to a color code of the first digital image 116. The color code of the first digital image may be the basis, which is used for mapping information data, in particular the identifier information.

The mapping 122 may be performed as follows. The color code, i.e. the color values of each pixel, of the first digital image 116 may be converted into hexadecimal numerals. For example, the conversion of the color values into hexadecimal numerals may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The hexadecimal numerals may be further converted into the binary code of the first digital image, for example, by using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/. The binary code of the first digital image 116 and the identifier information may be added.

The new binary information of the mapped data may be transferred into the color code of the second digital image 126. The added binary codes may be converted into hexadecimal numbers which may be converted into color values. For example, the conversion of hexadecimal numerals into the color values may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The second digital image 126 may be generated by using the determined color values for the corresponding image pixels. The second digital image 126 may differ from the first digital image 116. In particular, the pixels of the first digital image 116 and the second digital image 126 have different color values. The second digital image 126 may be an RGB image, wherein the primary color of the RGB image are red, green and blue. The second digital image 126 is forgery-proof, if the applied printer control setting and applied printer job is kept secretly. The method comprises printing the second digital image on a substrate 129 thereby generating the security label 110.

The method may further comprise generating at least one verification number. The term "verification number" may refer, without limitation, to a numeric value of a fixed length which uniquely representing data.

The generating of the verification number 131 may comprise
vi) (reference number 132) converting color values of the pixels of the second digital image 126 to a secondary color space 134 having at least four primary colors and determining a number of respectively colored pixels for each primary color of the secondary color space;
vii) (reference number 136) generating the verification number 131 by converting the determined number of respectively colored pixels for each primary color of the secondary color space to numerals.

Figure 2C:
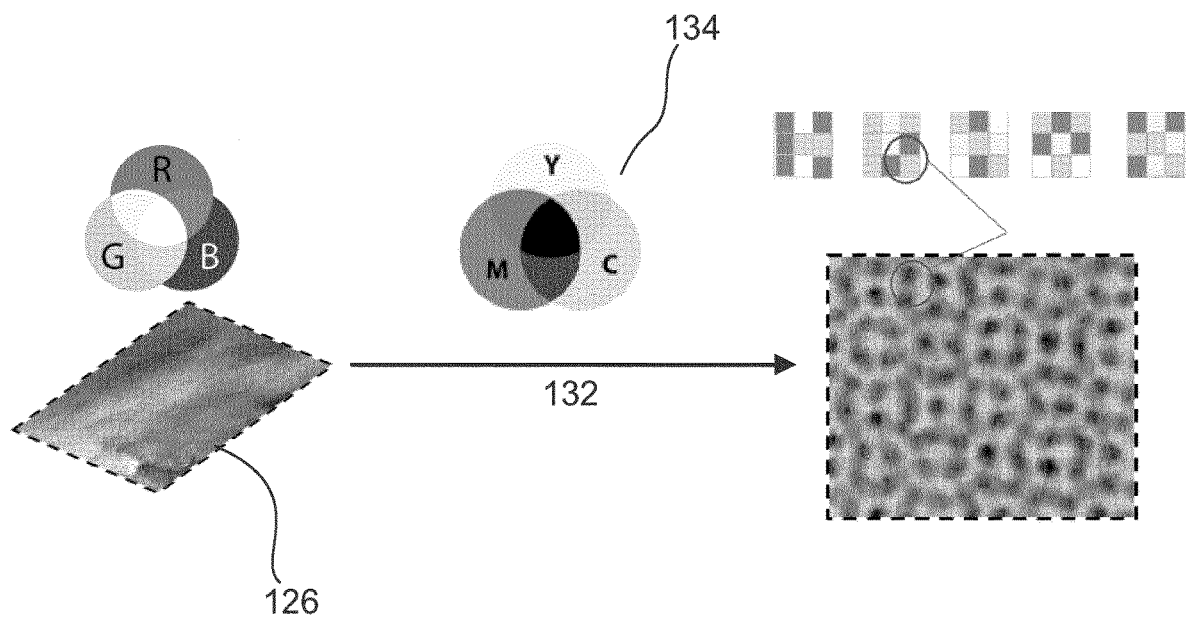

FIG. 2C show the converting 132 of the color values of the pixels of the second digital image 126 to a secondary color space 134 and the resulting image in the secondary color space. The secondary color space 134 may be a color space having a suitable number of primary colors, i.e. at least four primary colors. Preferably, the secondary color space 134 is the CMYK color space, wherein the primary colors of the secondary color space 134 are black, cyan, magenta, yellow and white, whereby white is meant as no color on a white substrate. The conversion from the RGB color space to the secondary color space 134 may be performed for each pixel of the second RGB image. The conversion from the RGB color space to the secondary color space 134 may be performed using at least one mathematical algorithm and/or at least one predetermined relationship such as a look-up table, e.g. as described in "Schule der Farben-Grundzüge der Farbentheorie für Computeranwender und andere", Küppers, Harald, DuMont Buchverlag, Köln 2. Edition, ISBN 978-3-7701-2841-9 or www.farbtabelle.at/farben-umrechnen. The conversion from the RGB color space may be performed using at least one software, in particular a software of the printer for converting the RGB colors.

The converted image may be further transformed into a pattern, thereby forming a rastered image, see FIG. 2C. The pattern may be a grid. The pattern may comprise at least one matrix comprising rows and columns indicating the presence or absence of primary colors of the respective pixel. The further transformation, in particular rastering, may be performed by the printer software. Next, the colored dots may be counted. The determining of the number of respectively colored pixels for each primary color of the secondary color space may comprise counting colored dots of the converted and rastered image, in particular of the matrices.

Figure 2D:
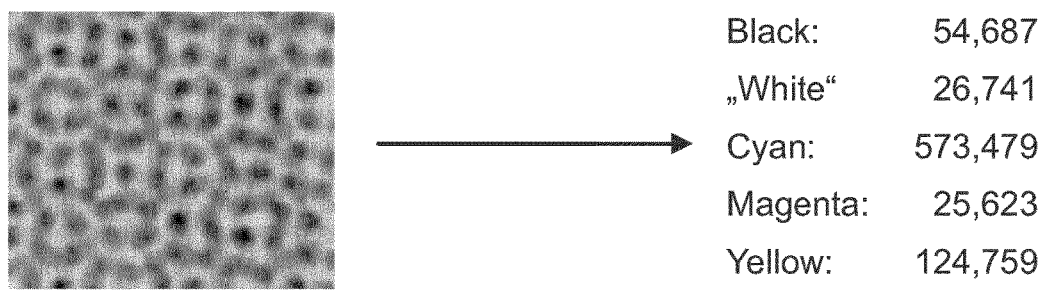

FIG. 2D shows an exemplary embodiment of converting the determined number of pixels of each primary color to hexadecimal numerals. Specifically, the color dot numbers are transferred to hexadecimal numerals. The conversion of the determined number into hexadecimal numerals into the color values may be performed using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/.

Figure 2E:
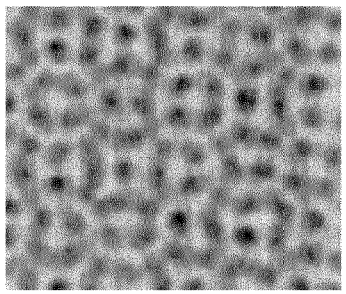

The generating of the verification number 131 may comprises converting the determined number of respectively colored pixels for each primary color of the secondary color space via a predefined formula to fixed-size hexadecimal values, see FIG. 2E. Specifically, the determined number of pixels of each primary color may be converted to a fixe-size value without decimal digits. The pre-defined formula may be a logarithmic formula. The information of the counted dots may be transferred into hexadecimal numerals via a logarithmic formula to fixed-size values. The pre-defined mathematical formula for converting the determined number of respectively colored pixels for each primary color of the secondary color space to fixed-size hexadecimal values may be "a+b*x+c*(x/16)+d*1000*ln(x+1), wherein "x" is the number of pixels of each primary color and a, b, c and d are parameters. For example, for generating 4-digit hexadecimal numerals, the value of "a" may be 4,096 for all of the following cases: In case of the sum of all pixels of each primary color is smaller than 60,000, "b" is 1, "c" and "d" are 0; in case of the sum of all pixels of each primary color is between 60,000 and 950,000, "c" is 1, "b" and "d" are 0. In case of the sum of all pixels of each primary color is larger than 950,000, "d" is 1, "b" and "c" are 0. Thereby, the result from the calculation by the predefined formula may be rounded down to full hexadecimal numerals." For example, for generating verification number of other fixed-size than 4-digit hexadecimal numerals, e.g. 3-digit or 10-digit, "a", "b", "c" and "d" may be be adjusted accordingly.

As described above, the RGB color code of the second digital image 126 derived from mapping the identifier information and the individual digital fingerprint may transferred into the color code of second color space 134, which can be the CMYK color space. The dots of the colors, which would be placed on a substrate in case of printing, may be counted and transferred into hexadecimal numerals. So, the "hash value" of the security label 110 may be generated by converting the determined number of respectively colored pixels for each primary color of the secondary color space to hexadecimal numerals. The hexadecimal numerals are applied as the verification number 131, which may be unique as the second digital image 126 of the security label 110.

The security label 110 may comprise optical readable information printed on the substrate 129, in addition to the second digital image 126. The method may comprise printing the verification number 131 on the substrate 129 as one or more of numerals, barcode, 2D code such as 2D barcode or QR code, and/or storing the verification number 131 on at least one electronic chip attached to the substrate 129.

The method may comprise generating a blockchain of security labels. The blockchain may be a blockchain of a supply chain. The blocks may reflect results of each checkpoint starting at the manufacturer. The second digital image 126 may be used as block and the verification number as hash. Method steps i) to vii) may be repeated for each subsequent block using the second digital image 126 of the preceding block as respective first digital image 116. The verification number 131 may be be uploaded into the blockchain of the supply chain. The verification number 131 may be used to monitor the product movement from checkpoint to checkpoint. The movement of the product from checkpoint to checkpoint may be defined as transaction. The checkpoints can be an interim storage or passing customs.

Figure 3:
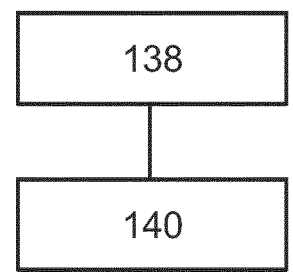
FIG. 3 shows an embodiment of a method for protection of at least one object from counterfeiting.

FIG. 3 illustrates a flowchart of a method for protection of at least one object from counterfeiting. The method comprises the following steps:
- a) (reference number 138) Generating at least one security label 110 using a method for generating at least one security label 110 according to the present invention,
- b) (reference number 140) Verification if the security label 110 is true, wherein the verification comprises reading the security label 110, retrieving at least one verification digital image from at least one database depending on the read security label 110, and comparing the retrieved verification digital image with the second digital image 126 of the security label, wherein the security label 110 is verified if the retrieved verification digital image and the second digital image 126 of the security label are identical at least within tolerances.

The reading may comprise a process of retrieving at least one item of information, such as the at least one item of information stored in the security label 110. The item of information may be the optical readable information comprising the verification number 131 and/or the verification number 131, e.g. in the electronic format, stored on the at least one electronic chip attached to the substrate of the security label. The reading may be performed by at a checkpoint. The reading may be performed by the consumer.

The reading may be performed by a reading device. The reading device may be configured for performing the reading as defined above. Specifically, the reading device may be or may comprise at least one of: a one- or two-dimensional scanner, a camera and/or a radio frequency reading device, such as a NFC reader. The reading specifically may take place electronically. The process of reading may depend on how the verification is present in the security label 110. The reading may comprise an optical reading in case of an optical identifier is used, such as a bar code and/or a QR code, e.g. by optical scanning. In case the verification number 131 is stored as an RFID code, the reading may comprise an electronic reading, such as a reading by near field communication (NFC). Other options are feasible.

The reading device may be integrated into a mobile device. The mobile device may be a mobile electronics device, more specifically to a mobile communication device such as a cell phone or smart phone. The mobile device may also refer to a tablet computer or another type of portable computer. Additionally or alternatively, the reading may be performed by a human. The method may further comprise inputting the read verification number into a user-interface of the mobile device.

The database may comprise or may be comprised by a data storage device. The database may comprise at least one data base management system, comprising a software running on a computer or computer system, the software allowing for interaction with one or more of a user, an application or the database itself, such as in order to capture and analyze the data contained in the data base. The database management system may further encompass facilities to administer the database. The database, containing the data, may, thus, be comprised by a database system which, besides the data, comprises one or more associated applications. The database may be or may comprise at least one database selected from the group consisting of: at least one server, at least one server system comprising a plurality of servers, at least one cloud server or cloud computing infrastructure. The database may comprise the blockchain and/or a representation of the blockchain.

The retrieving may comprise sending a query to the database comprising the verification number 131, e.g. by using a communication interface of the mobile device, and receiving the response from the database, e.g. by using the communication interface of the mobile device. As an example, the communication interface may be or may comprise at least one port comprising one or more of a network or internet port, a USB-port and a disk drive. The communication interface may be at least one web interface.

The verification, if the security label 110 is true, may be done by comparing the retrieved verification digital image with the second digital image 126 of the security label 110. The verification may be done by comparing the verification digital image with the digital image in the blockchain of supply chain. The verification may comprise scanning the second digital image 126 printed on the substrate. The verification may comprise comparing the scanned second digital image 126 and the verification digital image. The comparison of the scanned second digital image 126 and the verification digital image may be performed by using at least one processing device. The comparison of the scanned second digital image 126 and the verification digital image may be performed by using at least one image comparison algorithm.

The comparing of the colored pixels of the verification digital image and the scanned second digital image 126 may be performed pixelwise. The method may comprises pixelating the scanned second digital image 126 and/or the verification digital image. The pixelating may comprise dividing the scanned second digital image 126 and/or the verification digital image into pixels, in particular in a pre-defined number of pixels. For example, the pre-defined number of pixels may correspond to the number of pixels of the verification digital image. For example, the pre-defined number of pixels may depend on security requirements.

The method may comprise determining a color code of the pixelated second digital image 126 by converting the colored pixels to, e.g. hexadecimal or binary, numerals. For example, the conversion of the color values into hexadecimal numerals may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The hexadecimal numerals may be further converted into the binary code of the second digital image, for example, by using at least one mathematical algorithm and/or at least one predetermined relationship such as a look-up table, e.g. as described in "Improving Image Performance by Using Color Lookup Tables, Adobe developer support, Technical Note #5121, 31 Mar. 1992 or https://www.rgbtohex.net/hextorgb/.

The comparing of the colored pixels of the second digital image 126 and the verification digital image may comprise comparing color codes of the pixelated second digital image and the verification digital image. The comparing may comprise determining if the second digital image 126 and the verification digital image are identical at least within a pre-defined pixel color tolerance range. The retrieved verification digital image and the second digital image 126 of the security label may be considered identical if they are identical with respect to at least one primary color at least within tolerances. The retrieved verification digital image and the second digital image 126 of the security label 110 may be considered identical within a pixel color error tolerance range of ±30% for each of the primary colors of a pixel, preferably of ±10% for each of the primary colors of a pixel, more preferably of ±3% for each of the primary colors of a pixel. The retrieved verification digital image and the second digital image 126 of the security label 110 may be considered identical within an overall error tolerance range 10% of deviating pixels, preferably of 5% of deviating pixels, more preferably 1% of deviating pixels. As the optical appearance of the security label 110 can be differ compared to its digital image, e.g., due to possible aging of the security label 110 or due to different light spectrum while scanning, the verification of the label can be done by focusing on one color of the RGB color space, e.g., by only comparing the share of the red color of the scanned pixels. The error tolerance may lead to positive verification, if, firstly, the result of matching the color code of the scanned second digital image of the security label with the color code with its verification digital image uploaded in the blockchain is between certain boundaries, e.g., +−10%. Besides comparing the entire color code of the digital images, fraction of the full RGB color information can be used, e.g., red. Besides red, the verification of the security label may be done by the fraction of the blue color and by the fraction of the green color. The error tolerance may be defined by the share of pixels of the second digital image 126, which is congruent with its verification digital image uploaded in the blockchain, meaning that e.g., 90 of 100 pixels are according to pixels of the verification digital image uploaded in the blockchain. Both kinds of error tolerances may be applied in a combined way.

Figure 4:
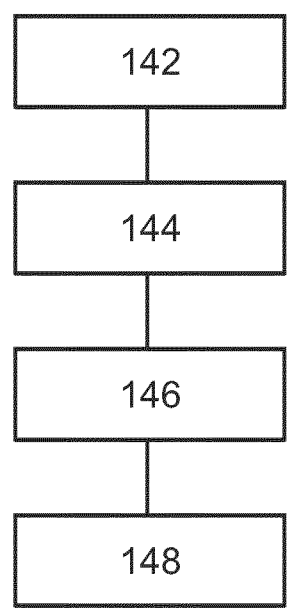
FIG. 4 shows an embodiment of a method for product security.

FIG. 4 shows a flowchart of an embodiment of a method for product security. The method comprises the following steps:

I) (reference number 142) generating at least one security label 110 using a method for generating at least one security label 110 according to the present invention and physically connecting the security label 110 with a product, wherein the identifier information is information about the product;

II) (reference number 144) generating at least one verification number 131, wherein the generating of the verification number comprises converting color values of the pixels of the second digital image 126 to a secondary color space 134 having at least four primary colors, determining a number of respectively colored pixels for each primary color of the secondary color space 134 and generating the verification number 131 by converting the determined number of respectively colored pixels for each primary color of the secondary color space 134 to numerals;

III) (reference number 146) applying the verification number 131 on the substrate 129;

IV) (reference number 148) adding the second digital image 126 as block and the verification number as hash to a blockchain of security labels 110 of a supply chain.

The applying 146 of the verification number 131 may comprise printing the verification number 131 on the substrate 129 as one or more of numerals, barcode, 2D code such as as 2D barcode or QR code and/or storing the verification number on at least one electronic chip attached to the substrate.

The method may further comprise monitoring product movement from check point to checkpoint by using the verification number 131.

The method may comprise verification if the security label 110 is true, wherein the verification may comprise reading, in particular scanning, the security label 110, retrieving at least one verification digital image from the blockchain of security labels depending on the scanned security label 110, and comparing the retrieved verification digital image with the second digital image 126 of the security label 110. The security label 110 may be verified if the retrieved verification digital image and the security label 110 are identical at least within tolerances. The retrieved verification digital image and the second digital image 126 of the security label 110 may be considered identical if they are identical with respect to at least one primary color at least within tolerances. The retrieved verification digital image and the second digital image 126 of the security label 110 may be considered identical within a pixel color error tolerance range of ±30% for each of the primary colors of a pixel, preferably of ±10% for each of the primary colors of a pixel, more preferably of ±3% for each of the primary colors of a pixel. The retrieved verification digital image and the second digital image 126 of the security label 110 may be considered identical within an overall error tolerance range 10% of deviating pixels, preferably of 5% of deviating pixels, more preferably 1% of deviating pixels. With respect to the process of verification reference is made to the description of a method for protection of at least one object from counterfeiting as given above.

Figure 5:
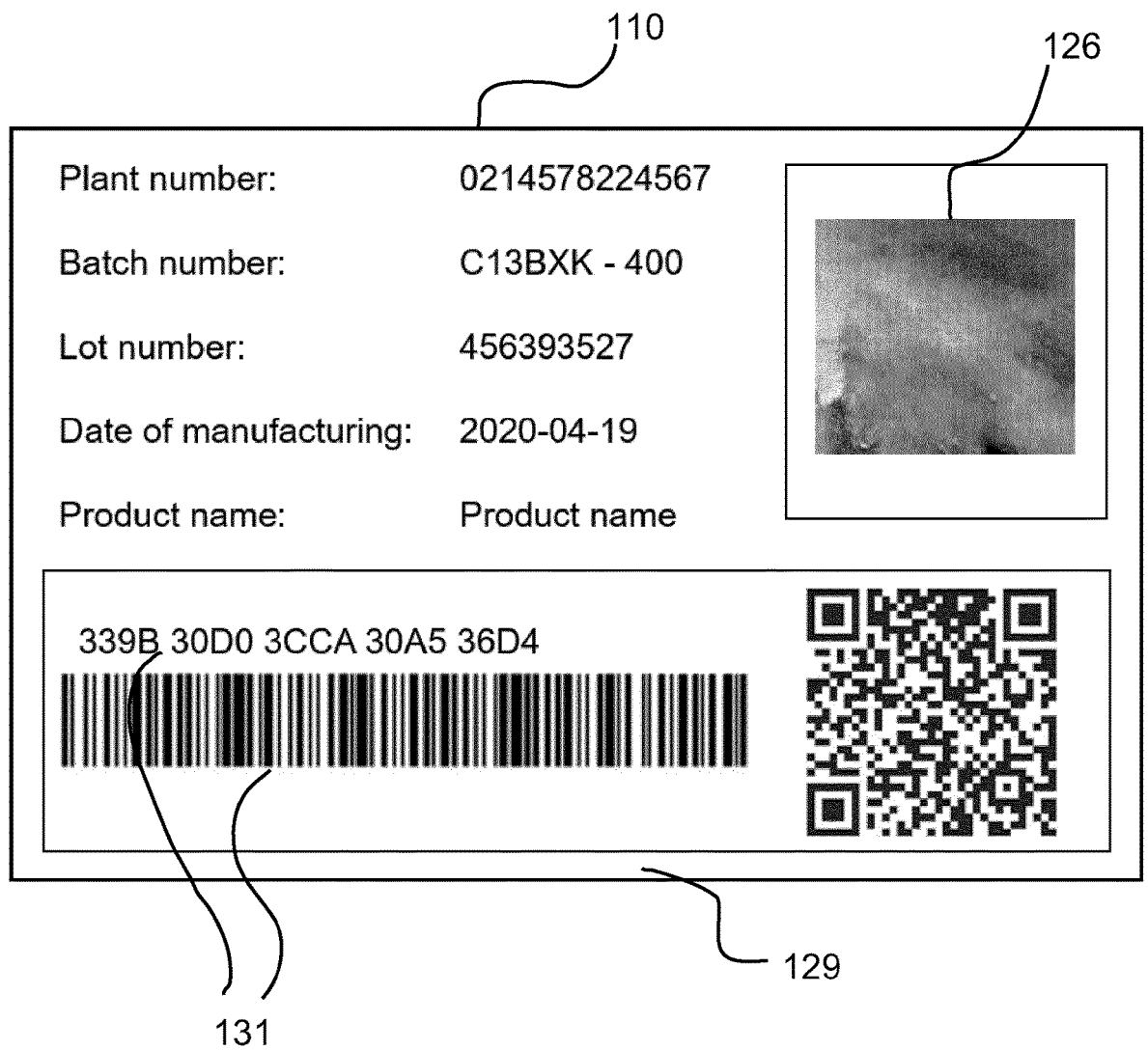
FIG. 5 shows an embodiment of a security label.

FIG. 5 shows an embodiment of a security label 110. The security label 110 may be a label having properties which can be used for identification and authentication of an object to which the security label 110 is attached. The security label 110 may be configured for providing protection of the object from counterfeiting. The object may be at least one object selected from the group consisting of a commercial article such as a bottle, a paper document, a wallet, a banknote, packaging and the like. The identity of the object may comprise information about a unique identifier assigned to the object. The identification may comprise a process of determining the unique identifier. The identification may allow tracking the object, such as in a supply chain from a manufacturer to a consumer. The authentication may comprise a process of proving an assertion about identity and origin of the object. The origin of the object may comprise information about one or more of information about the manufacturer, information about the time and/or the space the object entered a supply chain. For example, in case the security label 110 is verified to be true, the identity and origin of the object may be confirmed. In this case the object may be considered as genuine. Otherwise, in case the security label 110 is not verified, the origin of the object may not be confirmed and the object may be considered as forgery.

The security label 110 may be a feature of an object and/or attachable to an object. The security label 110 may comprise a substrate 129 and/or may be printable on a substrate. The substrate may be provided by the object itself. The substrate may be one or more of a piece of paper, a plastic film, cloth, metal, glass, or a surface of a spare part. For example, the security label 110 may be part of a branding. For example, the security label 110 may have a rectangular geometrical shape, a circular shape, an oval shape, a triangular shape, a polygonal form, a regular form, a random form, or an irregular form.

The security label 110 may be configured for being attachable to the object such as by adhesively bonding or hot stamping to a surface of the object. For example, the security label 110 may be self-adhesive. The security label 110 may be configured for providing mechanical protection. The security label 110 may be configured as a seal, wherein the seal may be configured for providing an indication of any attempted detachment. The second digital image 126 printed on the substrate 129 may be physically connected with the object. The connection with the object may be done in that way that any removal of the printed security label 110 would destroy the security label 110. For example, the security label 110 may be adhered to a surface of the object and may destroy at removal. The seal may allow providing a visual indication in case of any attempt to break the seal. This may allow further enhancing security.

LIST OF REFERENCE NUMBERS 110 security label
112 printing and/or scanning device
114 generating
116 first digital image
118 providing
120 binary code
122 mapping
124 generating
126 second digital image
128 printing
129 substrate
130 digital image element
131 verification number
132 converting
134 secondary color space
136 generating
138 generating
140 verification
142 generating
144 generating
146 applying
148 adding

The invention claimed is:

1. A computer implemented method for generating at least one security label using at least one printing device, wherein the method comprises the following steps:
   i) generating a first digital image comprising a plurality of colored pixels by printing a printer job with a printer control setting to generate a printout by using the printing device and scanning the printout using a scanning device thereby generating a digital fingerprint;
   ii) providing a binary code of identifier information;
   iii) mapping the identifier information with the digital fingerprint by determining a binary code of the digital fingerprint and adding the binary code of the identifier information to a color code of the first digital image;
   iv) generating a second digital image having a plurality of colored pixels different from the first digital image, by transferring the added binary codes into a color code of the second digital image;
   v) printing the second digital image on a substrate thereby generating the security label;
   vi) converting color values of the plurality of colored pixels of the second digital image to a secondary color space having at least four primary colors and determining a number of respectively colored pixels for each primary color of the secondary color space;
   vii) generating the verification number by converting the determined number of respectively colored pixels for each primary color of the secondary color space to numerals;
   wherein the method comprises generating a blockchain of security labels, wherein the second digital image is used as a block and the verification number is used as a hash, wherein method steps i) to vii) are repeated for each subsequent block using the second digital image of preceding blocks as respective first digital images.

2. The method according to claim 1, wherein generating of the first digital image comprises blending and/or mixing pigments and scanning the first digital image with the blended and/or mixed pigments.

3. The method according to claim 1, wherein the method comprises physically connecting the security label with an object.

4. A method for protection of at least one object from counterfeiting comprising the following steps:
   a) Generating at least one security label using a method for generating at least one security label according to claim 1,
   b) Verifying whether the security label is true, wherein the verification comprises reading the security label, retrieving at least one verification digital image from at least one database depending on the read security label, and comparing the retrieved verification digital image with the second digital image of the security label, wherein the security label is verified when the retrieved verification digital image and the second digital image of the security label are identical at least within tolerances.

5. The method according to claim 4, wherein the retrieved verification digital image and the second digital image of the security label are considered identical when they are identical with respect to at least one primary color at least within tolerances.

6. The method according to claim 4, wherein the retrieved verification digital image and the second digital image of the security label are considered identical within a pixel color error tolerance range of ±30% for each of the primary colors of a pixel, preferably of ±10% for each of the primary colors of a pixel, more preferably of ±3% for each of the primary colors of a pixel.

7. The method according to claim 4, wherein the retrieved verification digital image and the second digital image of the security label are considered identical within an overall error tolerance range 10% of deviating pixels, preferably of 5% of deviating pixels, more preferably 1% of deviating pixels.

8. The method according to claim 7, wherein the identifier information is one or more of product name, expiry date, customer, hazardous information, weight, storage temperature.

9. A method for product security, the method comprises the following steps:
   I) generating at least one security label using a method for generating at least one security label and physically connecting the security label with a product, wherein the identifier information is information about the product;
   II) generating at least one verification number, wherein the generating of the verification number comprises converting color values of the plurality of colored pixels of the second digital image to a secondary color space having at least four primary colors, determining a number of respectively colored pixels for each primary color of the secondary color space and generating the verification number by converting the determined number of respectively colored pixels for each primary color of the secondary color space to numerals;
   III) applying the verification number on the substrate;
   IV) adding the second digital image as a block and the verification number as a hash to a blockchain of security labels of a supply chain;
   wherein the method for generating at least one security label using a method for generating at least one security label comprises:
   i) generating a first digital image comprising a plurality of colored pixels by printing a printer job with a printer control setting to generate a printout by using the printing device and scanning the printout using a scanning device thereby generating a digital fingerprint;
   ii) providing a binary code of identifier information;
   iii) mapping the identifier information with the digital fingerprint by determining a binary code of the digital fingerprint and adding the binary code of the identifier information to a color code of the first digital image;
   iv) generating a second digital image having a plurality of colored pixels different from the first digital image, by transferring the added binary codes into a color code of the second digital image;
   v) printing the second digital image on a substrate thereby generating the security label.

10. A security label, wherein the security label is generated using a method for generating at least one security label according to claim 1 referring to a computer implemented method for generating at least one security label using at least one printing device.

11. The security label according to claim 10, for a purpose of use, of product security of products of a supply chain, secure signature for wallets, governmental services, financial services, medical services.

12. The method according to claim 1, wherein the method further comprises printing the verification number on the substrate as one or more of numerals, barcode, 2D code such as 2D barcode or QR code, and/or storing the verification number on at least one electronic chip attached to the substrate.

* * * * *